United States Patent [19]
Allen et al.

[11] Patent Number: 5,911,515
[45] Date of Patent: Jun. 15, 1999

[54] SELF CLINCHING ROLLING BEARING ASSEMBLY

[75] Inventors: Peter F. Allen, Alpharetta; Bryan T. Thompson, Peachtree City, both of Ga.

[73] Assignee: Spyraflo, Inc., Peachtree City, Ga.

[21] Appl. No.: 08/968,929

[22] Filed: Nov. 12, 1997

[51] Int. Cl.⁶ .............................. F16C 23/04; F16C 43/04
[52] U.S. Cl. ........................ 384/495; 384/537; 384/558; 384/585
[58] Field of Search .................................. 384/495, 496, 384/497, 498, 537, 538, 539, 558, 559, 584, 585, 428, 438, 439

[56] References Cited

U.S. PATENT DOCUMENTS

| | | |
|---|---|---|
| 3,252,742 | 5/1966 | Swanstrom . |
| 3,317,256 | 5/1967 | Ernest . |
| 3,749,463 | 7/1973 | Krapf ...................................... 384/539 |
| 4,129,343 | 12/1978 | Janssen ................... 384/558 |
| 4,512,673 | 4/1985 | Condon, Jr. et al. .................... 384/558 |
| 4,795,926 | 1/1989 | Someya et al. ...................... 384/439 X |
| 5,061,091 | 10/1991 | Shiratori .................................. 384/539 |
| 5,344,240 | 9/1994 | Tatro et al. ......................... 384/584 X |

*Primary Examiner*—Thomas R. Hannon
*Attorney, Agent, or Firm*—Womble Carlyle Sandridge & Rice

[57] ABSTRACT

A self clinching rolling bearing assembly comprises a generally cylindrical retainer configured to be press fit and self clinching in an opening formed in a sheet of metal. A rolling bearing, such as a needle bearing, is mounted into the retainer for rotatably receiving a shaft when the retainer is mounted in the opening. In one embodiment, the rolling bearing is press fit directly into the retainer and is rigidly secured by an interference fit. In another embodiment, the rolling bearing is press fit into a bearing sleeve and the bearing sleeve is mounted in the retainer for limited rocking movement relative to the longitudinal axis of the retainer. With the later embodiment, the rolling bearing is self aligning with a shaft rotatably inserted therethrough.

22 Claims, 2 Drawing Sheets

SELF CLINCHING ROLLING BEARING ASSEMBLY

TECHNICAL FIELD

This invention relates generally to rolling contact bearings for rotatably supporting shafts and the like. Specifically, the invention relates to self clinching and self aligning rolling bearing assemblies adapted to be press fit into openings formed in relatively thin sheet metal.

BACKGROUND OF THE INVENTION

Bearings for rotatably supporting the ends or mid portions of drive shafts and other types of shafts have been used for many years. Such bearings are available in a wide variety of forms for use under an equally wide variety of conditions. For example, bushings made of Teflon or other low friction plastic material are often used in situations where the shafts supported by the bearings are to be driven at relatively low rotation rates and are to bear relatively low lateral loads. To accommodate higher rotation rates and loads, bushings made of relatively soft porous metal such as bronze are often used. These types of metal bushings are advantageous over plastic bushings because they are able to bear higher lateral loads imparted by shafts and are able to accommodate higher rotation rates without overheating. In addition, porous metal bushings can be impregnated with an oil or another lubricant to reduce their coefficients of friction substantially.

In situations where high rotation rates and/or high lateral loads are to be accommodated, rolling bearings such as roller bearings and ball bearings are used. Rolling bearings offer very high lateral load bearing capability and have very low frictional resistance to accommodate much higher rotation rates than static bushings.

When rotating drive shafts are used in lighter equipment such as, for example, printers, plotters, and photocopy machines, it is common to support the shafts in bearings that are mounted in facing walls of a relatively thin metal chassis. In these circumstances, the bearings must be mounted to the walls of the chassis in such a way that they are precisely aligned with each other to receive the shaft without binding. In the past, this has been accomplished in a variety of ways. In some instances, opposing walls of the chassis are punched to form aligned holes. The bushings or bearings are then press fit into a mounting collar having mounting dogs or tabs for mounting the collar to a wall of the chassis with rivets or bolts to align the bearings with each other and with the punched holes in the chassis. While this method can work well, it is nevertheless relatively expensive because the mounting holes for the collars must be very precisely positioned for properly aligning the bearings and because several machining steps are required to mount the bearings to the walls.

Self clinching bushing assemblies have been available for securing and aligning plastic and metal bushings in opposed relatively thin sheet metal walls. U.S. Pat. No. 3,252,742 of Swanstrom discloses such a bushing assembly. The Swanstrom device includes a retainer that is adapted to be pressed into and clinch itself securely within a hole formed in a thin metal sheet. The retainer has a generally cylindrical pilot that is tapered in such a way that its narrow end can be inserted into the hole and, as the retainer is pressed further into the hole, its wide end spreads or stretches the hole slightly. A radially projecting annular head is formed at the wide end of the retainer and abuts the metal sheet when the retainer is fully pressed into the hole. An annular groove is formed in the pilot just beneath the head. When the retainer is fully pressed into the hole, the slightly stretched metal around the periphery of the hole contracts slightly into the annular groove to clinch the retainer securely in place and to align it perpendicular to the wall.

Swanstrom further discloses a plastic bushing disposed in the retainer. The bushing is formed with an outwardly projecting spherical bulge that rests against a tapered seat formed around the interior wall of the retainer and that is captured in the retainer by a crimping operation. In this way, the bushing is free to rock a bit relative to the central axis of the retainer but is nevertheless secured firmly therein. Accordingly, the plastic bushing can rock slightly as necessary to align itself precisely with a like bushing mounted in an opposing wall of the chassis for receiving and rotatably supporting a shaft.

U.S. Pat. No. 3,317,256 of Ernest discloses a similar bushing assembly wherein an lubricant impregnated packing is disposed and sealed between the retainer and a bushing mounted therein. The bushing of Ernest is made of a somewhat porous metal and thus slowly wicks lubricant from the packing through to the interface between the bushing and the shaft to provide longer term reduced friction between the bushing and the shaft. The Ernest apparatus is an attempt to accommodate higher rotation rates of the shaft than is possible with dry or impregnated bearings while still retaining the self clinching press fittable feature of the bearing assembly.

While bearing assemblies such as those disclosed in Swanstrom and Ernest have proven successful for economically installing plastic and metal bushings in relatively thin sheet metal walls, they nevertheless exhibit certain inherent shortcomings that limit their applicability. The most notable of these limitations is the inherent limitations on rotation rates and lateral load bearing capacity provided by static plastic and metal bushings. Even with lubricant impregnation and other lubricating techniques, such bushings will overheat, deform, and seize when shafts supported in them are rotated beyond a predefined limit or are subjected to substantial lateral loads. In these situations, rolling bearings must be used. However, to date there has not been available a rolling bearing assembly that can be press fit into an opening in a thin metal sheet in such a way that the assembly is self clinching and provides accurate alignment of a rolling bearing. This has been due in part to inaccurate chassis bending and punching techniques, which heretofore have not produced the tolerances required for rolling bearings, and in larger part to the failure of those skilled in the art to produce with success a functional rolling bearing assembly that exhibits self clinching press fittable characteristics. Accordingly, when rolling bearings are called for, they are still mounted in the traditional, cumbersome, and expensive way by being secured in a relatively thick bearing collar that must then be accurately mounted to the metal sheet with bolts or rivets extending through mounting dogs on the collar.

Accordingly, there exists a need for a rolling bearing assembly that offers the ease, convenience, and economy of self clinching press fittable installation in the relatively thin metal walls of an equipment chassis while at the same accurately aligning a rolling bearing rather than a static bushing for accommodating drive shafts that are to be rotated at high speeds or that are to bear high lateral loads. It is to the provision of such a rolling bearing assembly that the present invention is primarily directed.

SUMMARY OF THE INVENTION

Briefly described, the present invention, in one preferred embodiment thereof, comprises a self clinching rolling bearing assembly for being pressed into and mounted within a substantially circular opening of a predetermined diameter formed in a relatively thin metal sheet. The rolling bearing assembly comprises a retainer formed with a generally cylindrical body portion having an inner surface, an outer surface, a distal end, and a proximal end. The outer surface of the retainer is at least partially tapered to establish an outer diameter at its distal end that is less than the diameter of the opening formed in the metal sheet. The proximal end portion of the retainer has an outer diameter that is slightly larger than the diameter of the opening to establish an interference fit between the proximal end of the retainer and the opening as the retainer is pressed into the opening.

A generally annular head projects radially outwardly from the proximal end of the retainer for abutting the metal sheet in the region surrounding the opening therein when the retainer is pressed fully into the opening. An annular groove is formed in the retainer just below the head. When the retainer is pressed through the opening in the sheet metal, the opening is stretched slightly as the proximal end of the retainer passes tightly through it. When fully inserted, the metal surrounding the opening re-contracts slightly and flows into the annular groove to clinch and hold the retainer firmly in place in the sheet of metal.

A rolling bearing, which can be a roller bearing, a ball bearing, a needle bearing, or another type of rolling bearing, is mounted within the retainer. In one embodiment, the rolling bearing itself is press fit into a bearing sleeve that, in turn, is secured in the retainer for limited rocking movement relative to the longitudinal axis of the retainer. In this way, the bearing sleeve and its bearing can rock slightly to align itself precisely with a like bearing on an opposing wall of an equipment chassis for rotatably receiving a shaft. In another embodiment, the rolling bearing is press fit directly into the retainer and is fixed relative thereto. In this embodiment, the rolling bearing is not self aligning but nevertheless has been found to function well with chassis formed with modern chassis bending and punching techniques, which produce chassis with more accurately aligned walls and more accurately placed punched openings.

Thus, a bearing assembly is now provided that offers the many advantages of a rolling bearing for high speed high load conditions while at the same time providing the ease and economy of a self clinching press fittable device that can be installed in relatively thin sheet metal walls of a chassis.

It is therefore an object of the present invention to provide a rolling bearing assembly that can be press fit into relatively thin sheet metal.

It is another object of the invention to provide a self clinching press fittable bearing assembly that will accommodate much higher rotation rates and lateral loads than self clinching bushing assemblies of the past.

A further object of the invention is to provide a self clinching rolling bearing assembly that insures proper alignment of bearings when the assembly is pressed into a sheet metal wall.

A still further object of the invention is to provide a rolling bearing assembly that can be installed in a sheet metal wall with fewer manufacturing operations than with prior art rolling bearing assemblies and without the stringent tolerance controls required for bolt or rivet mounting processes of the past.

These and other objects, features, and advantages of the invention will become more apparent upon review of the detailed description set forth below when taken in conjunction with the accompanying drawing figures, which are briefly described as follows.

DETAILED DESCRIPTION OF THE PREFERRED EMBODIMENTS

Figure 1:
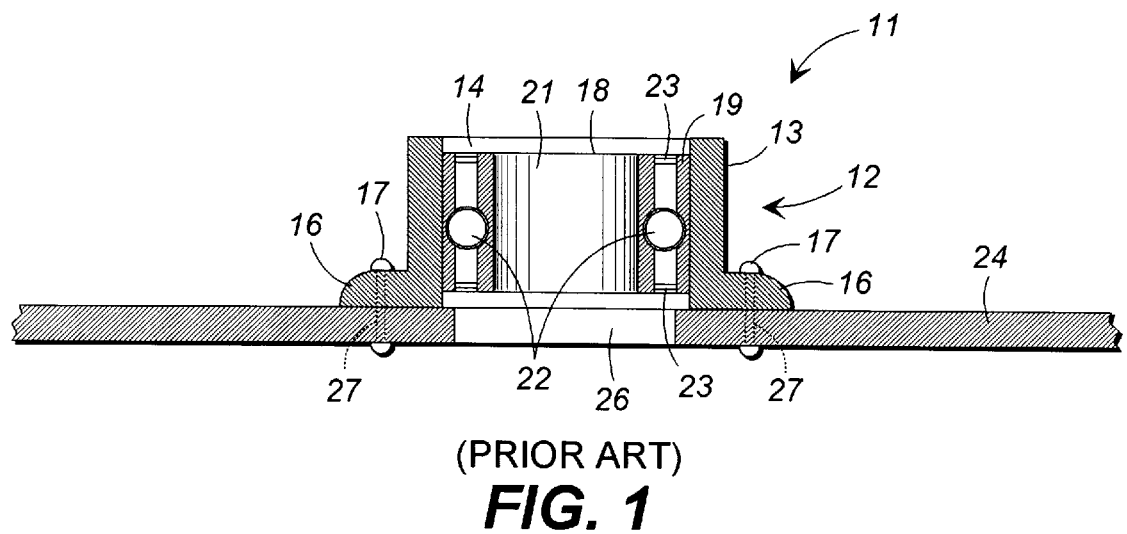
FIG. 1 is a sectional view illustrating a common prior art rolling bearing assembly mounted to a surface with rivets extending through mounting dogs.

Referring now in more detail to the drawings, in which like numerals refer to like parts throughout the several views, FIG. 1 illustrates a typical prior art rolling bearing assembly mountable to a relatively thin sheet metal plate. The prior art assembly 11 comprises a metal collar 12 having a substantially cylindrical outer wall 13 and a substantially cylindrical inner wall 14. A pair of tabs or mounting dogs 16 project from the base of the collar and are bored to accept appropriate fasteners such as bolts or rivets 17.

A rolling bearing 18, which, in FIG. 1 is a ball bearing, is press fit into the collar 12 so that it is securely held therein. The ball bearing illustrated in FIG. 1 has an annular outer shell 19, an annular inner shell 21 and an array of metal balls 22 captured between the shells. Seals 23 are often provided on such bearings for keeping dust and dirt out of the bearing and for sealing in lubricants that may be provided in the bearing. The rolling bearing 18 can be mounted in the collar 12 in a variety of ways such as, for example, press fitting, thermal fitting, or, in some cases, with retaining rings that allow the bearing to be removed and replaced.

The rolling bearing assembly 12 of the prior art is mountable to a relatively thin sheet of metal 24, which has been provided with an opening 26 for accommodating a shaft disposed in the rolling bearing 18. Preferably, the opening 26 is larger than the shaft of the bearing to provide appropriate clearance therefor. An array of mounting holes 27 are carefully and accurately bored or punched in the sheet 24 for receiving the fasteners 17 to mount the rolling bearing assembly 12 to the sheet 24. As mentioned above, the process of drilling or punching the holes 27 must be performed accurately to provide holes in precisely the proper positions so that the assembly 12 is properly aligned on the sheet 24. Further, the mounting process itself is time consuming and requires that the assembly 12 be positioned and that two, four, or more fasteners 17 be manually installed and tightened to mount the assembly 12 to the sheet 24. Thus, the process of preparing the sheet 24 to receive the prior art assembly 12 and the continued process of mounting the assembly 12 to the sheet 24 is a multi-step operation requiring substantial time and resources in the manufacturing process.

Figure 2:
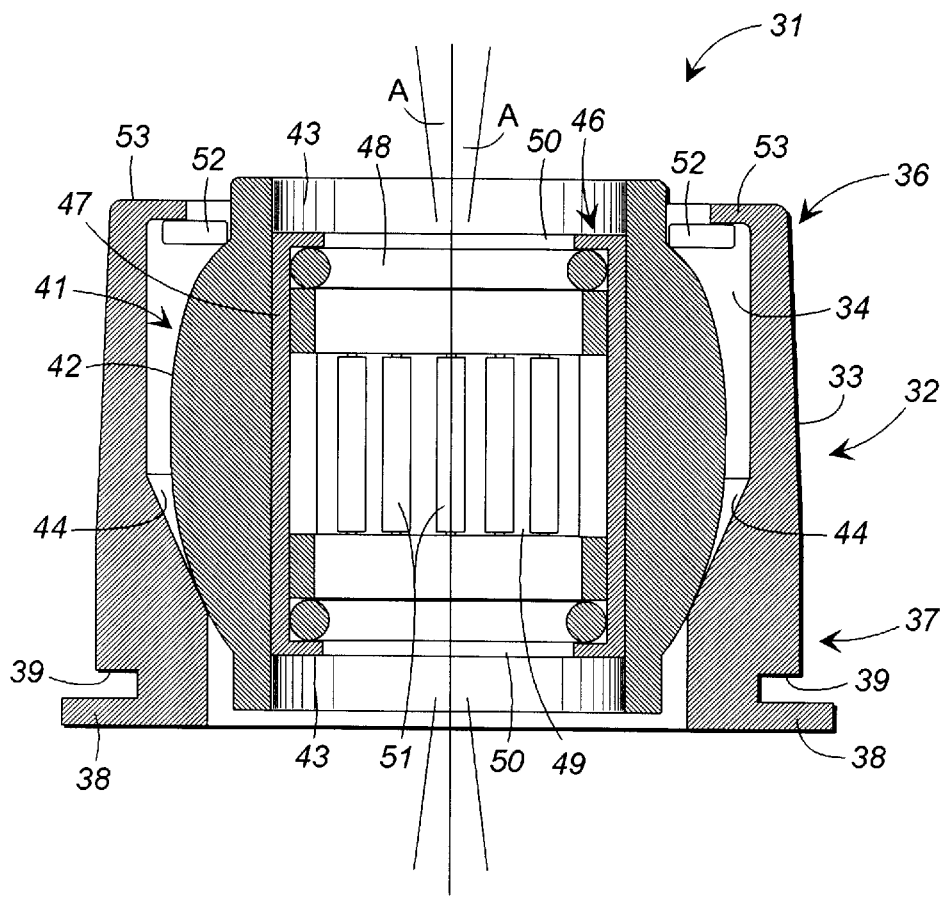
FIG. 2 is a sectional view of a self clinching rolling bearing assembly that embodies principles of the present invention in one preferred form.
Figure 4:
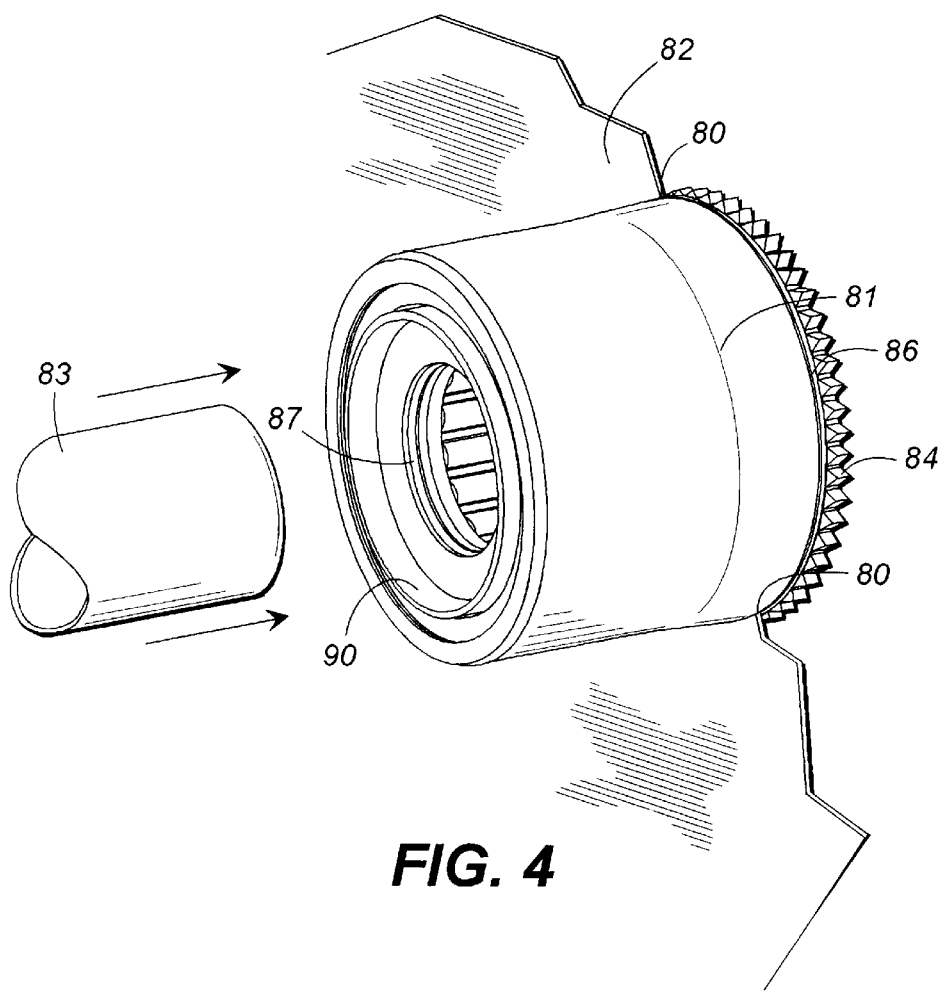
FIG. 4 is a perspective partially sectioned view of a rolling bearing assembly of the present invention shown mounted in a sheet of metal and receiving a shaft to be rotatably supported by the needle bearing of the assembly.

FIG. 2 is a side elevational sectional view of a self clinching rolling bearing assembly that embodies principles of the present invention in a preferred form. The rolling bearing assembly 31 comprises a metal retainer 32 that is formed of a material, such as stainless steel, that is harder than the sheet metal material into which the assembly is to be pressed. The retainer 32 can be formed through a variety of processes such as, for example, turning, molding, or powdered metal techniques. The retainer 32 is generally cylindrical in shape having a distal end 36, a proximal end 37, an outer wall 33, and an inner wall 34. A radially projecting generally annular head 38 is formed at the extreme proximal end of the retainer 32 and projects outwardly therefrom a predetermined distance. The function of the head 38 is to abut the metal around the perimeter of an opening through which the assembly is to be pressed when the assembly is completely installed in the opening. As best seen in FIG. 4, the head 38 is provided with a serrated peripheral edge 84, which anchors the assembly in place and prevents it from rotating when it is installed in a thin metal sheet. An annular recess 39 is formed in the proximal end 37 of the retainer 32 at the base of the head 38 for purposes described in more detail below.

The outer surface 33 of the retainer 32 is tapered along at least a portion of its length to provide a distal end 36 having an outer diameter that is less than the opening into which the retainer is to be pressed. The proximal end 37 of the outer surface 33 has a diameter that preferably is slightly larger than the diameter of the opening and, in any event, is no less than such diameter. With this configuration, it will be understood that as the retainer 32 is pressed into an opening formed in a sheet of metal, the metal in the region surrounding the opening is stretched or expanded slightly as the proximal end portion 37 of the retainer 32 slides through the opening.

Figure 3:
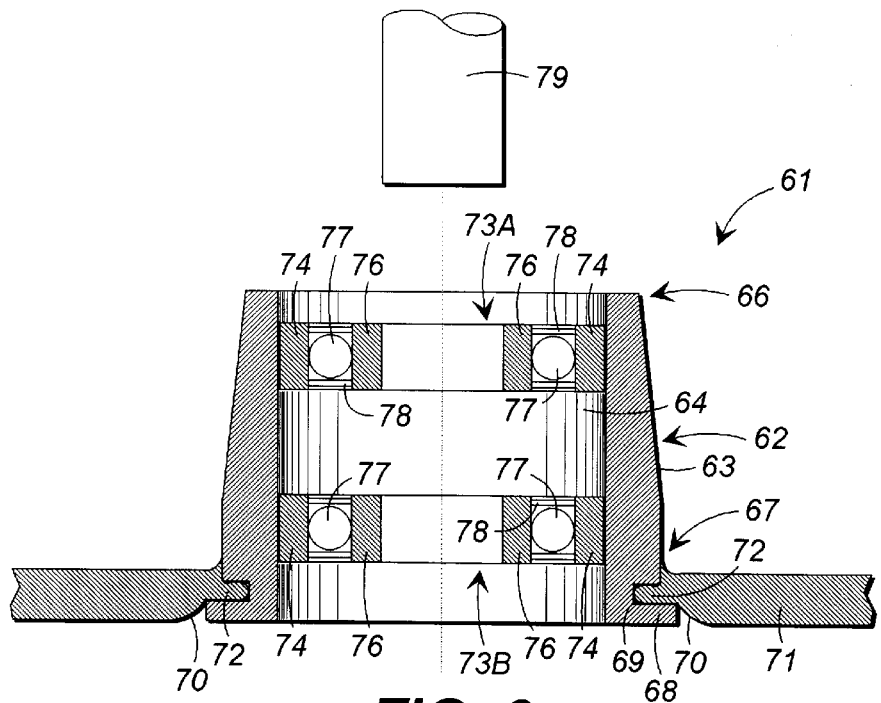
FIG. 3 is a sectional view of a self clinching rolling bearing assembly that embodies principles of the present invention in an alternate form.

When the retainer 32 is fully inserted into the opening with its head 38 abutting the metal sheet around the perimeter of the opening, the slightly expanded metal of the sheet contracts and flows at least partially into the annular recess 39 at the foot of the head 38 (see FIG. 3). This functions to secure the retainer 32 firmly in place within the opening and to hold the head 38 tightly against the metal surrounding the opening in the sheet. The serrated peripheral edge of the head 38 grips the sheet to prevent rotation of the retainer 32 in the opening. Thus, it can be seen that the retainer 32 is press fittable and self clinching in an opening formed in a relatively thin sheet of metal and the installation process requires only one pressing step.

A bearing sleeve 41 is disposed within the retainer 32. The bearing sleeve 41 has an outer surface 42 and a substantially cylindrical inner surface 43. The outer surface 42 of the bearing sleeve 41 is formed with a substantially spherical or at least partially spherical bulge that projects outwardly along at least a portion of the length of the sleeve. The inner surface 34 of the retainer 32 is formed with a tapered seat 41 that is configured and positioned such that the spherical bulge of the bearing sleeve rests against the seat within the retainer 32 as shown. With this configuration, it will be seen that the bearing sleeve 41 is free to rock back and forth on the tapered seat 44 through a predetermined angle A with respect to the central axis of the retainer 32. This rocking or swiveling action of the bearing sleeve 41 provides self aligning characteristics as described in more detail below.

An annular washer 52, which can be made of a suitable plastic material, surrounds the upper end portion of the bearing sleeve 41 and partially spans the space between the bearing sleeve and the distal end portion 36 of the retainer 32. Preferably, the washer 52 also rests against the top of the spherical bulge formed in the bearing sleeve. The extreme end portion 53 of the retainer 32 is crimped or otherwise bent over to capture the washer 52 and to hold it firmly in place between the bearing sleeve 41 and the retainer 32. The bearing sleeve 41 is thus captured between the tapered seat 44 and the washer 52 and is held firmly and securely in place thereby. However, the bearing sleeve 41 is still free to rock within the retainer 32 as necessary to align itself with a shaft inserted through the assembly.

A rolling bearing assembly 46 is mounted in the bearing sleeve 41. In the illustrated embodiment, the rolling bearing assembly 46 comprises a roller bearing having an outer casing 47 with crimped ends 50. Captured between the crimped ends 50 of the roller bearing assembly are a pair of flexible seals 48 and a roller retainer 49. The roller retainer 49 is configured to receive and hold a set of cylindrical rollers 51 loosely in place while, at the same time, allowing the rollers 51 to roll freely around the inside surface of the outer casing 47 of the bearing. Thus, when a shaft is inserted through the bearing, it is supported on the rollers 51 and, when the shaft is rotated, the rollers roll between the outer casing 47 of the bearing and the shaft to provide low friction rotatable support for the shaft.

Rolling bearing assemblies such as the roller bearing illustrated in FIG. 2 are common and known in the art. While a roller bearing has been illustrated in the preferred embodiment, it will be understood that a wide variety of bearing types might be mounted in the bearing sleeve 41. However, it has been discovered that rolling bearings of the type illustrated provide an advantage in that they exhibit a minimum outside diameter for a given inside diameter of the bearing. Nevertheless, the invention should not be construed to be limited to any type or configuration of rolling bearing and the roller bearing assembly illustrated in FIG. 2 is shown as only illustrative and as a preferred embodiment.

The bearing sleeve 41 can be made from a variety of materials such as steel, aluminum, bronze, plastic, or the like. However, it is preferable that the sleeve be formed of a material that will ride relatively easily on the tapered seat 44 of the retainer 32 without seizing or otherwise unduly wearing. In this regard, it has been found that bronze as a material for the bearing sleeve functions well. Further, the rolling bearing assembly 46 preferably is mounted in the bearing sleeve 41 by a pressing operation wherein the bearing assembly is securely held in place by an interference fit between its outer casing 47 of the bearing and the inner surface 43 of the bearing sleeve.

It will thus be seen that the assembly 31 comprises a press fitable self clinching rolling bearing assembly that can be installed easily and quickly with a single pressing operation in an opening formed in a relatively thin sheet of metal. In this respect, the assembly 31 provides many of the advantages of prior art self clinching bushing assemblies. However, the rolling bearing assembly 46 extends substantially the usefulness of the assembly 31 over the prior art because the rolling bearing accommodates much higher rotation rates of a shaft than a bushing and supports much higher lateral loads than a bushing. Accordingly, with the present invention, a self clinching rolling bearing assembly is provided that can be used in many situations where prior art bushing assemblies are not applicable.

FIG. 3 illustrates an alternate embodiment of the present invention wherein the rolling bearings are fixed within the retainer itself rather than being installed in a rocking bearing sleeve. The rolling bearing assembly 61 of this embodiment comprises a generally cylindrical retainer 62 having a distal end 66, a proximal end 67, an outer surface 63, and an inner surface 64. As with the embodiment of FIG. 1, the outer surface 63 is tapered along at least a portion of its length to define a distal end 66 having an outer diameter that is less than the diameter of an opening into which the assembly is to be pressed. The outer diameter of the retainer 62 at its proximal end 67 preferably is slightly larger than the diameter of the opening. A radially projecting annular head 68 is provided at the extreme proximal end of the retainer and an annular groove 69 is formed at the base of the head.

The retainer 62 in FIG. 3 is illustrated as it appears when pressed into an opening formed in a relatively thin sheet of metal 71. As the retainer 62 is pressed into the opening, the metal around the perimeter of the opening is expanded or stretched slightly and, when the retainer 62 is fully pressed into place, this stretched material contracts and flows at least partially into the annular groove 69 as illustrated at 72. Further, the pressing process itself forms a slight indentation 70 in the surface of the sheet metal and this indentation accommodates the head 68. In this way, the head 68 of the retainer 62 becomes substantially flush with the surface of the sheet metal 71 when the assembly is pressed into place. Accordingly, the assembly 61 is press fitable and self clinching in an opening formed in a relatively thin sheet of metal 71.

In contrast to the embodiment of FIG. 2, the inside surface 64 of the retainer 62 in FIG. 3 is substantially cylindrical in shape and is not formed with a tapered seat. A rolling bearing assembly 73, which in the embodiment of FIG. 3 is illustrated as comprising a pair of ball bearings 73A and 73B, is press fit into the retainer 62 and held securely therein by an interference fit between the bearings and the inner surface 64 of the retainer 62. The pair of ball bearings illustrated in FIG. 3 are presented to emphasize the flexibility of the present invention and to show that it can easily be supplied with a wide variety of rolling bearings. For example, roller bearings have been illustrated in FIG. 2 and ball bearings have been illustrated in FIG. 3. In addition, the invention could be supplied with other types of rolling bearings such as needle bearings where longitudinal loads are to be supported, clutch bearings that allow rotation only in one direction, or any other type of rolling bearing that can be installed in the retainer 62. In this regard, the configurations of the rolling bearings shown in FIGS. 2 and 3 should not be considered to be a limitation upon the present invention.

The ball bearings illustrated in FIG. 3 each has an outer bearing shell 74 and an inner bearing shell 76. A set of hardened metal balls 77 are captured between the shells 74 and 76 and seals 78 can be provided if desired to keep dirt out of the bearings. The inner bearing shell 76 is sized to receive and support a shaft 79 that is to be rotatably supported by the assembly 61. As with the roller bearings of FIG. 2, the ball bearings of FIG. 3 accommodate much higher rotation rates and much higher lateral loads than the self clinching bushings available in the past.

While the inside surface 64 of the retainer 62 is cylindrical throughout its entire length in FIG. 3, it should be understood that the inner surface 64 might be formed with a variety of configurations for supporting various types of bearings. For example, where a bearing is to be pressed directly into the retainer 62 as shown in FIG. 3, the inner surface 64 could be formed with an annular shoulder against which the bearing rests for aligning the bearing properly within the retainer 62. These and other configurations of the inner surface 64 might well be provided within the scope of the present invention.

FIG. 4 is a perspective partially sectioned view of the embodiment of FIG. 2 of the present invention illustrating its appearance when installed in an opening formed in a relatively thin sheet of metal 82. The rolling bearing assembly 81 is seen to be press fit and clinched within an opening 80 formed in the sheet metal 82 as described above. The serrated peripheral edge 84 of the head of the retainer securely grips the metal around the periphery of the opening to prevent any tendency of the assembly 81 to rotate within the opening. A roller bearing 87 is shown mounted in its bearing sleeve 90, which, in turn, is mounted within the retainer for limited locking motion therein as described above. In use, a pair of retainer assemblies 81 generally are mounted in opposed parallel walls of a metal chassis. A drive shaft or other shaft 83 is then inserted through the opposed assemblies and is supported by the rolling bearings extending between the walls of the chassis. The shaft 83 can then be rotated at high rates of rotation and can support high lateral loads as it rotates within the bearing assemblies in which it is mounted.

The invention has been described herein in terms of preferred embodiments and methodologies. It will be obvious to those of skill in the art, however, that various additions, deletions, and modifications might well be made to the illustrated embodiments within the scope of the invention. For example, as discussed above, while roller bearings and ball bearings have been illustrated, the invention is equally applicable to virtually any type of rolling bearing assembly that can be mounted within the self clinching retainer of the invention. This includes special purpose bearings such as, for example, linear ball bushings, needle bearings, clutch bearings, and others. In addition, while a pair of ball bearings have been illustrated in FIG. 3 to illustrate the flexibility of the invention, a single ball bearing could be used just as easily. Further, the various components of the assembly can be manufactured from a variety of materials as long as the retainer is made of a material that is harder than the material of the sheet into which it is to be installed. These and other additions, deletions, and modifications might well be made to the illustrated embodiments without departing from the spirit and scope of the invention as set forth in the claims.

We claim:

1. A self clinching rolling bearing assembly for being pressed into and mounted within a substantially circular opening of a predetermined diameter formed in a sheet of material, said rolling bearing comprising:

a retainer formed with a generally cylindrical body portion having a predetermined length, a longitudinal axis, an inner surface, an outer surface, a distal end portion, and a proximal end portion;

said outer surface of said retainer being tapered along at least a portion of its length to establish an outer diameter at said distal end portion of said cylindrical body that is less than the predetermined diameter of the opening formed in the sheet material into which said bearing assembly is to be pressed;

said proximal end portion of said retainer having an outer diameter that is no less than the predetermined diameter of the opening formed in the sheet material to establish an interference fit between said proximal end portion of said retainer and the opening as said retainer is pressed into the opening;

a generally annular head terminating and projecting radially outwardly from said proximal end portion of said retainer for abutting the sheet material in a region surrounding the opening formed therein when said retainer is pressed into the opening;

said outer surface of said retainer being formed with an annular groove of predetermined dimensions located adjacent said head, the sheet material at least partially flowing into said annular groove when said retainer is pressed into said opening to clinch and secure said retainer firmly in place within the opening;

a rolling bearing having an axis; and means for mounting said rolling bearing in said retainer with said axis of said rolling bearing aligned substantially along said longitudinal axis of said retainer.

2. A self clinching rolling bearing as claimed in claim 1 and wherein said rolling bearing has an outer surface having a diameter that is no less than the inner diameter of said inner surface of said retainer and wherein said means for mounting said rolling bearing in said retainer comprises an interference fit between said outer surface of said rolling bearing and said inner surface of said retainer, said rolling bearing being pressed into position within said retainer for securing said rolling bearing firmly in place therein.

3. A self clinching rolling bearing assembly as claimed in claim 1 and wherein said means for mounting said rolling bearing in said retainer comprises a bearing sleeve having a longitudinal axis, an outer surface sized to be received in said retainer and a substantially cylindrical inner surface having a diameter that is predetermined to receive and secure said rolling bearing with an interference fit when said bearing is pressed into said bearing sleeve, and means for mounting said bearing sleeve in said retainer for limited rocking movement of said bearing sleeve within said retainer to provide for self-alignment of a rolling bearing mounted in said bearing sleeve when a shaft is inserted through said rolling bearing.

4. A self clinching rolling bearing assembly as claimed in claim 3 and wherein said means for mounting said bearing sleeve in said retainer comprises a generally spherical bulge formed in said outer surface of said bearing sleeve, a tapered seat formed in said inner surface of said retainer, and means for securing said bearing sleeve within said retainer with a portion of its spherical bulge resting against said tapered seat.

5. A self clinching rolling bearing assembly as claimed in claim 4 and wherein said means for securing said bearing sleeve within said retainer comprises an annular retaining washer disposed in said distal end portion of said retainer with said washer at least partially spanning the space between said inner surface of said retainer and said bearing sleeve, said distal end of said retainer being crimped over an outer peripheral portion of said annular retaining washer to hold said washer and said bearing sleeve firmly in place within said bearing sleeve.

6. A self clinching rolling bearing assembly as claimed in claim 1 and wherein said rolling bearing comprises a roller bearing.

7. A self clinching rolling bearing assembly as claimed in claim 1 and wherein said rolling bearing comprises a ball bearing.

8. A self clinching rolling bearing assembly as claimed in claim 1 and wherein said annular head is formed with radially projecting teeth for engaging the sheet material when said carrier is pressed into the opening formed therein to inhibit rotation of said carrier within the opening.

9. A self clinching rolling bearing assembly adapted to be pressed into an opening formed in a sheet of material, said rolling bearing assembly comprising, in combination, a retainer having a generally cylindrical body portion with a distal end, a proximal end, an outer surface, and an inner surface, said outer surface of said retainer being contoured to be press fit into the opening formed in the sheet material and including means for securing said retainer firmly in place within the opening, and a rolling bearing mounted in said retainer for rotatably receiving a shaft when said assembly is pressed into the opening in the sheet material.

10. The self clinching rolling bearing assembly of claim 9 and wherein said rolling bearing comprises a roller bearing.

11. The self clinching rolling bearing assembly of claim 9 and wherein said rolling bearing comprises a ball bearing.

12. The self clinching rolling bearing assembly of claim 9 and wherein said rolling bearing has an outer surface with a predetermined diameter and wherein said inner surface of said retainer is substantially cylindrically shaped and has a diameter that is no greater than the diameter of the rolling bearing, said rolling bearing being pressed into said retainer and secured therein by an interference fit between said inner surface of said retainer and said outer surface of said rolling bearing.

13. The self clinching rolling bearing assembly of claim 9 and wherein said retainer has a longitudinal axis and wherein said assembly further comprises a bearing sleeve mounted in said retainer for limited rocking movement relative to said longitudinal axis of said retainer, said bearing sleeve having a generally cylindrical central bore and said rolling bearing being secured within said central bore of said bearing sleeve, whereby said rolling bearing is free to rock a limited amount with said bearing sleeve when rotatably receiving a shaft to align itself automatically with the axis of the shaft.

14. The self clinching rolling bearing assembly of claim 13 and wherein said bearing sleeve is formed with an outer surface having an outwardly projecting generally spherical bulge and wherein said inner surface of said retainer is formed with a seat against which a portion of said bulge rests and moves when said bearing sleeve is mounted in said retainer, said assembly further comprising means for securing said bearing sleeve in said retainer.

15. The self clinching bearing assembly of claim 14 and wherein said means for securing said bearing sleeve in said retainer comprises an annular washer disposed in said distal end of said retainer spanning a space between said inner surface of said retainer and said bearing sleeve, said distal end of said retainer being at least partially crimped over said annular washer to hold said washer and said bearing sleeve in place within said retainer.

16. The self clinching rolling bearing assembly of claim 15 and wherein said spherical bulge is shaped and sized to ensure that said annular washer rests against said spherical bulge such that said spherical bulge is captured between said seat and said annular washer to hold said bearing sleeve in place within said retainer and to permit limited rocking movement of said bearing sleeve relative to said retainer.

17. A rolling bearing assembly mountable in a hole formed in a sheet of material, said rolling bearing assembly comprising, in combination, a retainer adapted to be press fit into and to clinch itself within the hole and a rolling bearing mounted in said retainer for rotatably receiving a shaft when said assembly is mounted in the hole.

18. A rolling bearing assembly as claimed in claim 17 and wherein said rolling bearing is rigidly mounted in said retainer.

19. A rolling bearing assembly as claimed in claim 17 and wherein said retainer has a longitudinal axis and wherein said rolling bearing is mounted in said retainer for limited rocking movement relative to said longitudinal axis of said retainer to allow said rolling bearing to align itself with a shaft rotatably inserted therethrough when said assembly is pressed into the hole formed in the sheet material.

20. In combination, a sheet of material having a hole formed therethrough, a bearing retainer press fit and self clinched in said hole, and a rolling bearing mounted in said bearing retainer for rotatably receiving a shaft when said retainer is mounted in said hole.

21. The combination of claim 20 and wherein said bearing retainer has a longitudinal axis and further comprising means for providing limited rocking movement of said rolling bearing in said retainer relative to said longitudinal axis thereof.

22. The combination of claim 21 and wherein said means for providing limited rocking movement comprises a bearing sleeve mounted in said retainer for limited rocking movement relative to said longitudinal axis of said retainer, said rolling bearing being securely mounted within said bearing sleeve.

* * * * *